Dec. 5, 1967   C. W. VIGOR   3,355,971
METHOD OF PRODUCING METAL STRIPS
Filed Sept. 3, 1965   4 Sheets-Sheet 1

INVENTOR.
Charles W. Vigor
BY
Paul Fitzpatrick
ATTORNEY

Dec. 5, 1967  C. W. VIGOR  3,355,971
METHOD OF PRODUCING METAL STRIPS
Filed Sept. 3, 1965  4 Sheets-Sheet 3

INVENTOR.
Charles W. Vigor
BY
Paul Fitzpatrick
ATTORNEY

Dec. 5, 1967  C. W. VIGOR  3,355,971
METHOD OF PRODUCING METAL STRIPS
Filed Sept. 3, 1965  4 Sheets-Sheet 4

INVENTOR.
Charles W. Vigor
BY
Paul Fitzpatrick
ATTORNEY

United States Patent Office 3,355,971
Patented Dec. 5, 1967

3,355,971
METHOD OF PRODUCING METAL STRIPS
Charles W. Vigor, Rochester, Mich., assignor to General Motors Corporation, Detroit, Mich., a corporation of Delaware
Filed Sept. 3, 1965, Ser. No. 484,968
12 Claims. (Cl. 82—47)

ABSTRACT OF THE DISCLOSURE

A method of manufacturing a thin strip of metal by peeling a surface layer from a rotating cylindrical metal billet with a cutting tool while simultaneously pulling the formed metal strip over the tool. The tension in the strip is controlled to regulate the strip thickness.

Practically all thin metal sheets are produced by progressively rolling long coils of stock, which originally were metal ingots or slabs, to a thinner gauge. As the metal gets thinner, the rolling process becomes much more difficult and more expensive. Thus, this rolling method requires expensive manufacturing facilities and results in products which are impaired by impurities residing at the surface of the ingots and the rollers. In addition, with some materials such as stainless steel, annealing is necessary after approximately each 50% reduction in thickness.

It is, therefore, the object of this invention to substantially reduce the cost of producing thin metal sheets by employing metal peeling, rather than rolling. This invention accomplishes this result without the necessity of introducing external heat to the metal being peeled. The process is carried out by feeding a suitable cutting tool into a rotating billet of metal and using a tension-producing wind-up apparatus which pulls the metal strip as it is peeled from the billet. This wind-up apparatus, in addition to putting the metal strip in tension, winds the resulting sheet metal strip into a coil which is convenient for handling and shipping.

In general, the machine with which the invention is realized in production includes a work spindle, a variable speed drive motor for the work spindle, a gear reduction transmission to connect the drive motor and the work spindle, a cutting tool, a feed mechanism for the cutting tool, various guide rollers for the resulting metal strip, a straightening apparatus for the initial portion of the metal strip, and a driven wind-up and tensioning apparatus.

Other objects, features and advantages of the subject invention will become obvious upon reference to the following detailed description and the drawings showing the preferred embodiment of the invention, wherein.

The machine shown includes a number of unique component parts which make it practicable. First of all, it has an extremely stable spindle mechanism, which is necessary in order to result in a smooth metal strip. Any variation in the rotation of the spindle will result in chatter and a wavy metal strip. Part of this stability of the spindle is due to an internal cooling system which carries excess heat away from the spindle to thereby avoid any thermal expansion in the spindle. This same internal cooling system also cools the metal billet being peeled so as to keep its heat from flowing into the spindle and to avoid any thermal expansion in the billet. An external cooling spray is further provided to cool the outside of the billet so as to avoid any thermal gradient in the billet. An important and necessary feature of the invention is an extremely rigid cutting tool assembly. Any undesired movements in the tool assembly will result in chatter at the cutting surface and a wavy and unsmooth metal strip. Hence, an extremely strong and rigid tool holder assembly has been provided. Also a metal strip straightener in the form of a wire brush rotating in the opposite direction to the billet has been provided to uncurl and straighten the metal strip as it is peeled from the billet. A wind-up assembly which applies tension to the metal strip as it is peeled from the billet is provided so as to control the thickness of the metal strip. Further details of these unique features of the invention will be set forth in the following description.

Figure 1:
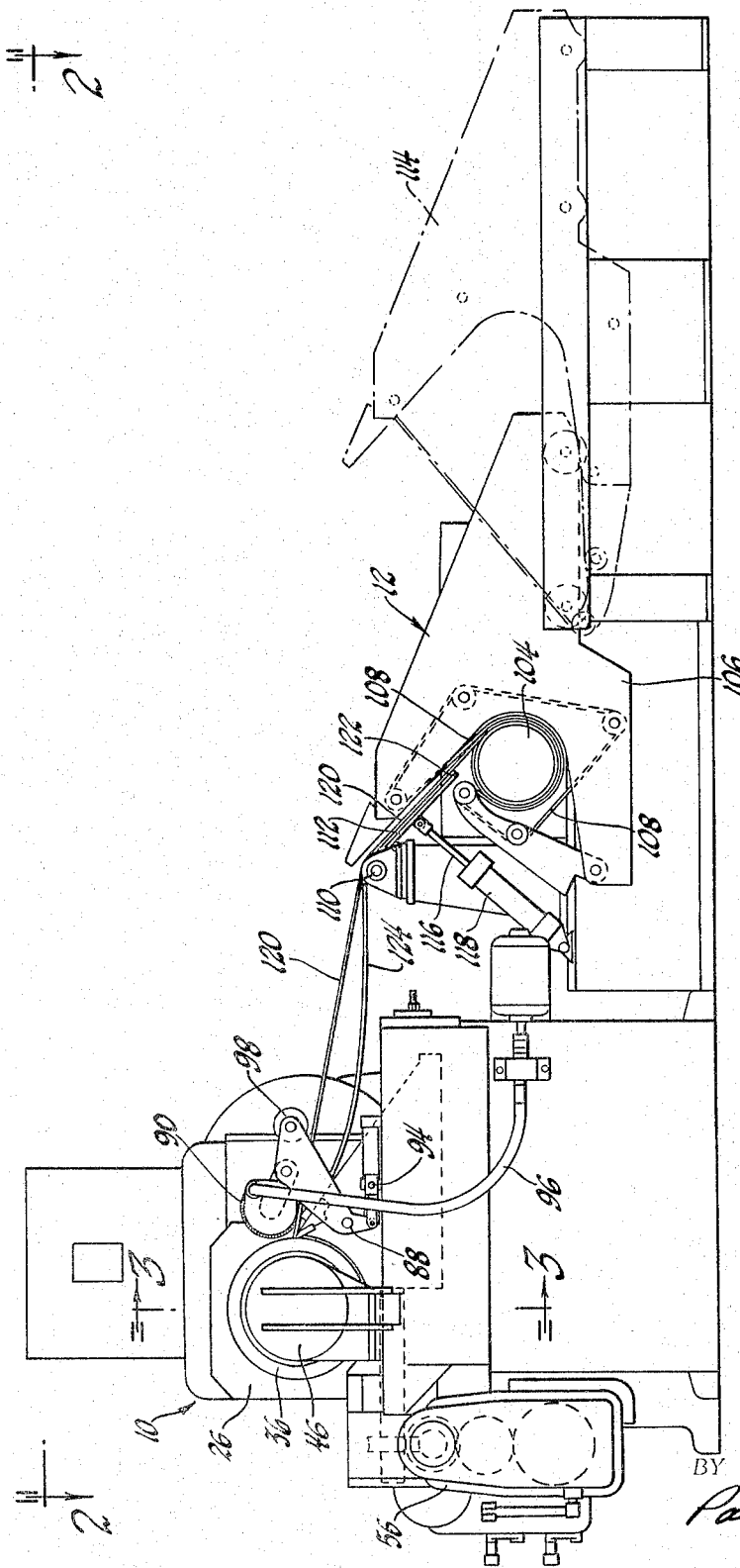
FIGURE 1 is a side elevation of a metal sheet making machine according to the subject invention.
Figure 2:
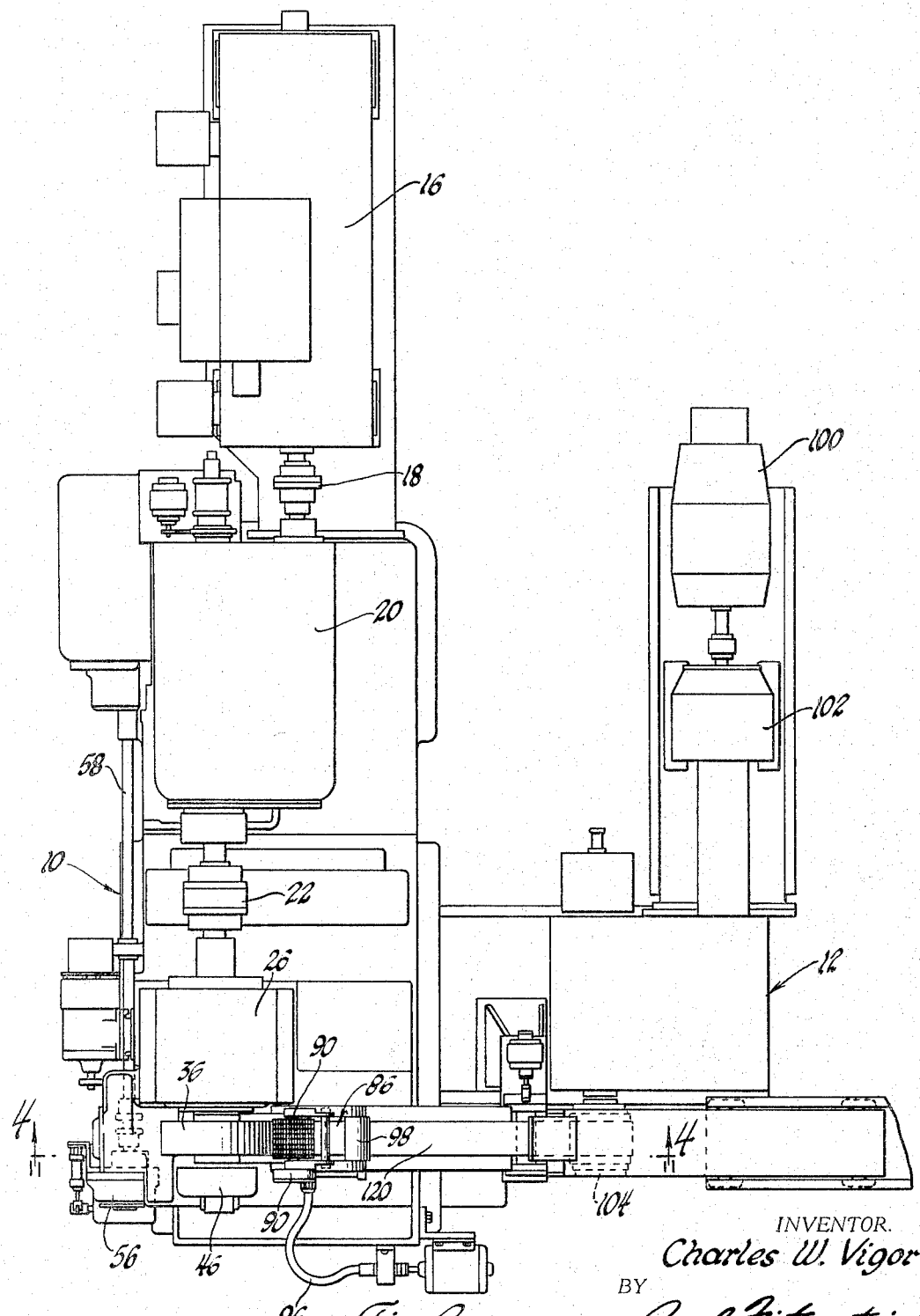
FIGURE 2 is a plan view of the same machine.

The drawings show a spindle and its driving components generally indicated by the number 10 in FIGURES 1 and 2, and a wind-up device and its driving components generally indicated by the number 12.

Figure 3:
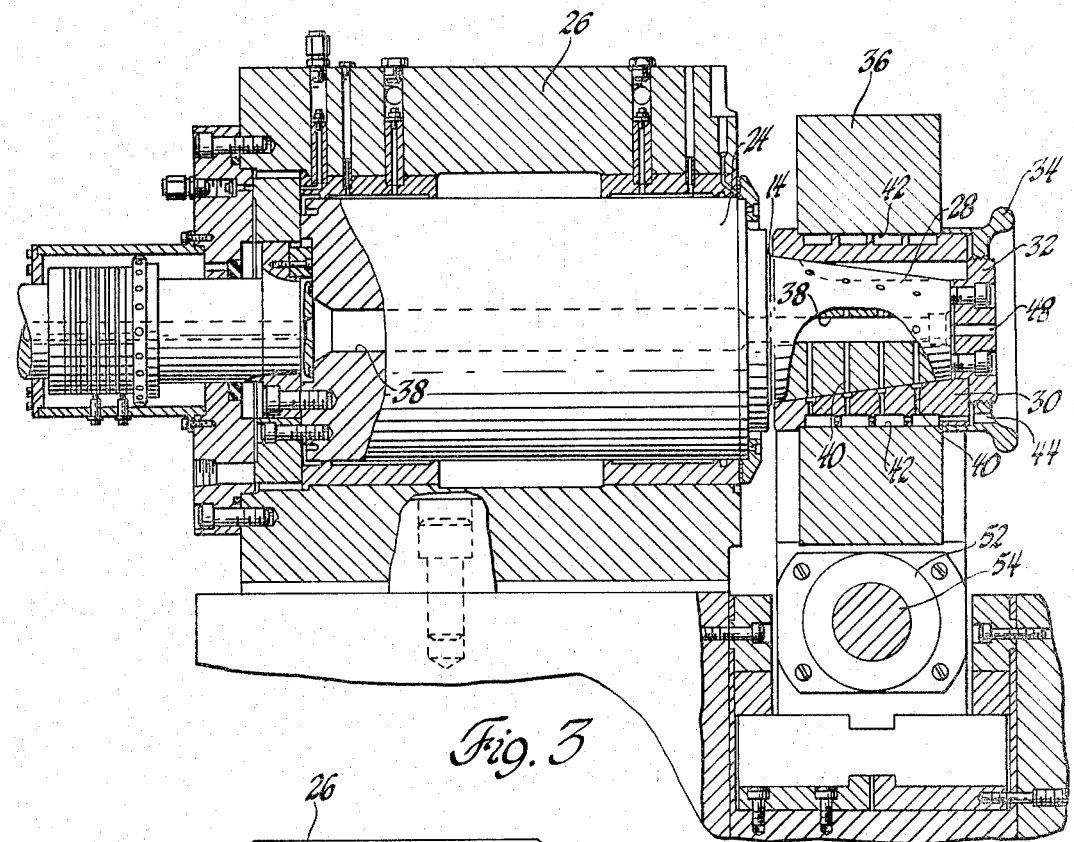
FIGURE 3 is a sectional view taken in the direction of arrows 3—3 in FIGURE 1.

A spindle 14 is powered by a drive motor 16 which may be of any suitable type to meet the power requirements of the particular cutting operation. It is highly desirable that the motor be controllable to vary the speed in infinitesimal increments over a considerable range to maintain a constant surface cutting speed. This can best be understood when one considers the fact that as the billet being cut becomes smaller the surface cutting speed becomes less unless corrected by increasing r.p.m. Therefore, the speed of the spindle must be increased gradually as the billet becomes smaller. The output of this drive motor 16 is passed through a coupling 18 to a headstock and gear box 20 which may be of the type used in heavy-duty lathes. The output of the headstock 20 is directly coupled by suitable shafting 22 to the spindle 14. The spindle 14, as shown in more detail in FIGURE 3, includes an externally pressurized, hydrostatically-supported shaft 24 fitted within a housing 26 with an extremely close diametrical clearance between the shaft and the housing. It is extremely important to the success of the resulting peeling operation that the spindle be supported in a very stable and accurate manner so as to decrease the possibility of any irregular movement by the metal billet being supported by the spindle. Since hydrostatic bearings of this general type are well known, it is not deemed to be necessary to fully discuss the details of such a mechanism. The spindle 14 terminates in a tapered arbor 28, which is adapted to accept a suitable chucking device 30. The chucking device 30 has a threaded collar 32 bolted to the arbor 28 over which a retainer 34 is threaded. A hollow, cylindrical metal billet 36 is positioned snugly on and around the chucking device 30 and clamped between the left hand shoulder of the chucking device and retainer 34, which is threaded to member 32 and rotates with the arbor 28. An important feature of this spindle 14 is a centrally located cooling passage 38 which extends the full length of the shaft 24 and the arbor 28. Within the housing 26, the cooling passage 38 serves the function of cooling the shaft 24, thereby helping to maintain stable running clearance between the shaft 24 and the housing 26. The cooling in this area is extremely important, as it has been found that small changes in temperature can cause the shaft 24 to expand a sufficient amount to be interfered with by the housing 26 and actually freeze up, thereby preventing rotation.

Within the arbor 28 the cooling passage 38 connects with a plurality of radial cooling passages 40 which extend outward through the arbor 28 and the chucking device 30. The coolant which passes through these radial passages 40 comes in contact with the billet 36 at its inner surface 42 and then passes through an axial passage 44 into an external coolant collection device 46 (shown in FIGURE 1). Thus, the coolant flow cools both the inner surface of the billet 36 and the arbor and chucking device so as to prevent heat from the billet from being conducted through the chucking device and arbor back into the shaft 24. Thus, this internal coolant system functions to cool the shaft 24, the arbor 28, the chucking device 30, and the interior of the billet 36. In addition, an external coolant spray is provided to cool the outer surface of the billet 36. This coolant spray also prevents the formation of oxides which discolor the metal strip. Thus, the billet is cooled on both its internal and external surfaces, thereby minimizing the possibility of heat conduction through the arbor back into the shaft 24, which might result in unstable rotation or eventually in freezeup.

The smoothness of the metal strip is greatly dependent upon the rigidity of the cutting tool assembly. Any undesirable movement in the cutting tool assembly will result in chatter at the cutting surface and an unsmooth and wavy metal strip. Thus the success of this invention depends to a great degree on the rigidity of the cutting tool assembly.

Figure 4:
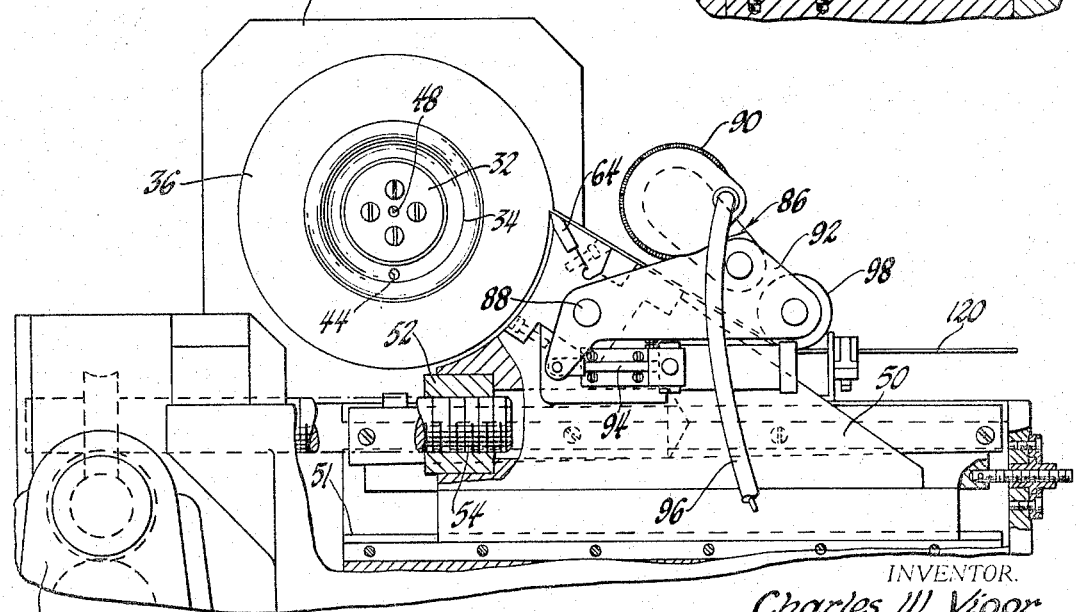
FIGURE 4 is an enlarged view taken in the direction of arrows 4—4 in FIGURE 2.
Figure 5:
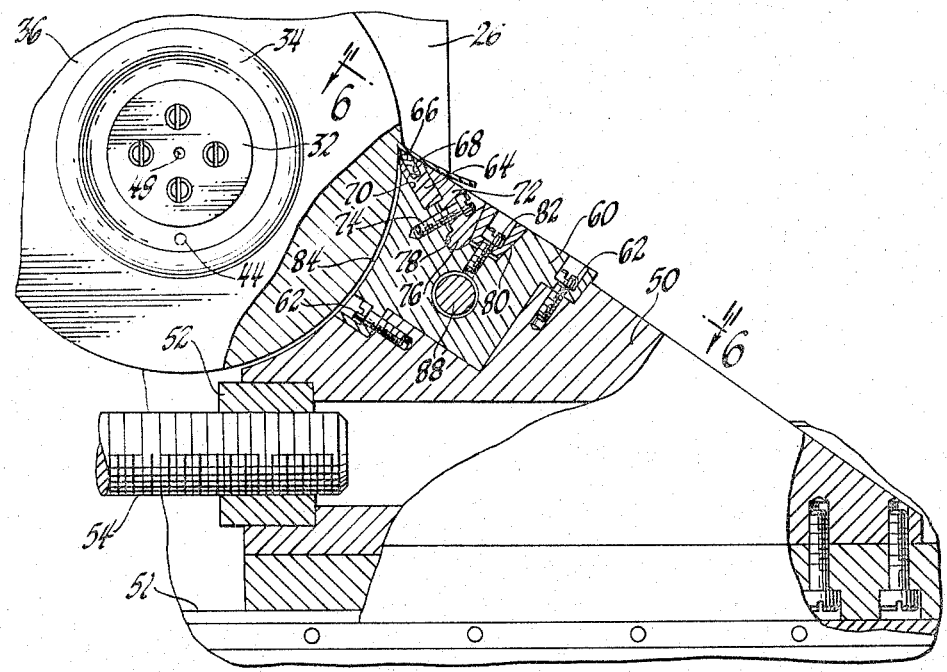
FIGURE 5 is an enlarged view of the cutting tool and metal billet with parts broken away and in section.
Figure 6:
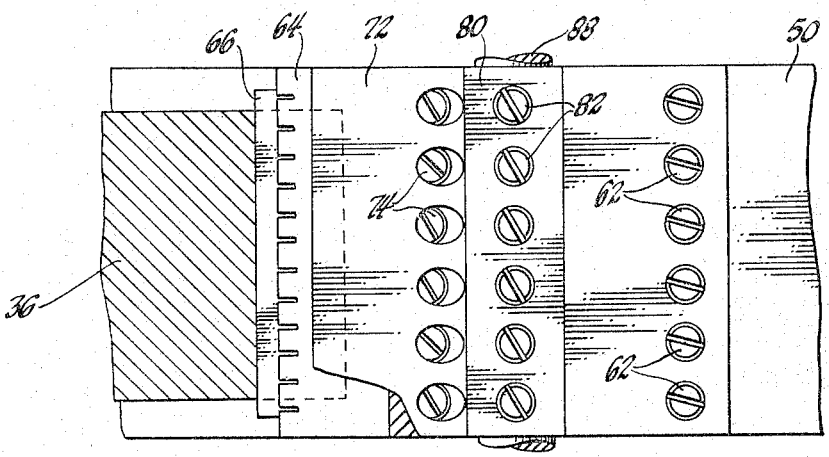
FIGURE 6 is a plan view taken in the direction of arrows 6—6 in FIGURE 5.

An extremely rigid cutting tool assembly and the drive means therefor are shown generally in FIGURE 4 and in more detail in FIGURES 5 and 6. A body member 50 is driven on ways 51 by a nut 52 and a cross feed screw 54. As shown in FIGURE 2 the cross feed screw is driven through a cross feed gear box 56 directly coupled to the gear box 20 by a shaft 58. The body portion 50 is then fed toward or away from the billet 36 by the feed mechanism just described. A tool holder 60 is fixed to the body member 50 by a plurality of screws 62. The number of screws 62 needed will depend upon the size of the tool holder and the amount of rigidity required to withstand the forces resulting from the cutting operation. A cutting tool 64 includes a cutting insert 66 which resides in a longitudinal slot 68 in the cutting tool 64. The cutting tool insert 66 may be any suitable high speed cutting tool material, such as a tungsten, carbide or titanium. The cutting tool 64 is placed in a recess 70 in the upper por- of the tool holder 60 so that the cutting tool insert 66 extends slightly beyond the outer surface of the tool holder 60 so that it is adapted for cutting contact with the rotating metal billet 36. The recess portion 70 in the tool holder 60 is formed at a proper angle so that the cutting tool 64 will be oriented with respect to the rotating billet 36 so as to achieve the proper angle for successful cutting. A clamp member 72 is secured to the tool holder 60 by screws 74 so that it rigidly secures the cutting tool 64 within the recess 70 in the tool holder 60. The clamp 72 has a locking tongue portion 76 which fits in a locking groove 78 in the tool holder 60 to result in the prevention of sliding movement of the clamp 72 with respect to the tool holder 60. The number of screws 74 used to secure the clamp 72 to the tool holder 60 will depend on the width of the tool holder 60 and the necessary strength requirements. A wedge 80 is inserted into the upper portion of the tool holder 60 directly behind the clamp 72 to further force the clamp 72 to maintain its clamping contact with the tool holder 60. The wedge 80 is secured to the tool holder 60 by screws 82; the number of which also depends on the size of the tool holder 60 and the strength requirements. The wedge 80 in effect serves the purpose of diverting any forces on the clamp 72 so that they always tend to drive the clamp 72 into closer contact with the tool holder 60 thereby preventing it from sliding with respect to the tool holder 60 and from separating from the tool holder 60. In general, it should be noted that the front surface 84 of the tool holder 60 is contoured to closely approximate the outer contour of the rotating billet 36 to facilitate the positioning of the tool holder 60 as close as possible to the rotating billet 36 while providing maximum support. It should be noted further that this contouring of the tool holder 60 enables the cutting tool 64 to have as much as possible of its body portion held within tool holder 60 and yet still have its cutting tool insert 66 extend slightly beyond the surface of the tool holder 60 to be in cutting engagement with the billet 36. Hence, it can be seen that the paritcular combination of parts comprising the tool holder assembly have been chosen because of their cooperative effect which provides the strength and rigidity necessary to result in an even cutting operation and to thereby withstand the forces created at the point of contact between the cutting tool and the rotating billet.

The metal strip peeled from the billet comes off in a curled pattern. Hence, in order to be able to feed this metal strip to a windup device and to place it in tension, the strip must be straightened. Thus, a metal strip straightener assembly 86 (FIGURE 4) is pivotally mounted to a bearing shaft 88 on the tool holder 60 and moves with the tool holder 60. It includes a brush mechanism 90 rotating about an axis parallel to the axis of the billet, which contacts the free end of the metal strip, which is initially peeled from the billet 36, and straightens the strip so that it is more easily fed toward the windup assembly. The rotating brush 90 is mounted on a movable bracket 92, which in turn is pivoted about the bearing shaft 88. A suitable actuation means 94 is provided to be connected to the bracket 92 to provide a force which pivots the bracket 92 on the bearing shaft 88. The wire brush 90 is rotated by a flexible shaft 96. Thus, the brush 90 undergoes three different types of movement, namely: a transverse movement with the tool holder assembly, a pivotal motion about the shaft 88, and a rotating movement about its own axis. Also mounted on the bracket 92 is a guide roller 98 which contacts the metal strip after it has been straightened by the wire brush 90 thereby guiding the strip on a predetermined path toward the windup assembly 12. Bracket 92 is pivotable such that when the initial portion of the metal strip is cut from the billet the rotating wire brush 90 is in contact with the metal strip and performs an anti-curl or straightening function. Once the metal strip is being pulled by the windup assembly, the bracket 92 is pivoted so that the wire brush 90 is no longer in contact with the metal strip and as a result of this pivoting, the guide roller 98 is in contact with the metal strip. The remaining details of the operation of the tool holder and the straightening mechanism will be discussed in connection with the overall operation of the machine.

Referring to FIGURE 2, the windup device 12 includes a drive motor 100, a speed reducer assembly 102, and a windup mandrel 104. This windup device 12 also functions to control the tension applied to the metal strip by applying more or less pull upon actuation by a speed sensor (not shown). The windup device 12 also includes a wrapper assembly 106 as best seen in FIGURE 1 which has a conventional belt wrapper 108, a roller 110 and a plate 112 which guide the metal strip onto the windup mandrel 104. This wrapper assembly 106 is shown in its operating position in solid lines and in its non-operating retracted position in dashed lines 114 in FIGURE 1. It should be noted then that once the metal strip has been successfully fed onto the windup mandrel 104, the wrapper assembly 106 moves to the position shown in dashed lines 114 in FIGURE 1. An actuation piston 116 retracts into cylinder 118 to pivot plate 112 away from the metal strip 120 when the belt wrapper 108 moves away from the mandrel 104. An air blast is shot from a nozzle 122 in the end of plate 112 for the purpose of producing a further guiding force on the metal strip so that it is urged to wind around the windup mandrel 104. This air blast from nozzle 122 keeps the metal strip flat against the drum surface where it emerges from the restraint of the belt. This insures that the end of strip will be caught snugly under the wrap. The natural tendency of the strip is to curl away from the drum and, if caught at all in the wrap, to create a buckle.

The remainder of this description will be directed toward the operational cycle for this method of producing a metal strip by a metal peeling machine. Initially, the annular metal billet 36 is placed on the adjustable chucking device 30 and is securely clamped thereto. The wrapper assembly 106 is then moved into the position shown in solid lines in FIGURE 1. The straightening apparatus 92 is pivoted so that the rotating brush 90 will be in contact with the metal strip as it is initially peeled from the billet 36. The tool body member 50 is advanced in rapid traverse to a preset position at which the cutting tool is approximately .02 inch away from the billet surface, whereupon the rapid traverse movement of the tool ceases, the screw feed drive between nut 52 and cross feed screw 54 is engaged, and the spindle drive motor 16 is started. The cutting tool is then fed slowly into the billet and the first metal strip 120 is peeled therefrom. The initial metal strip 120 is quite tightly curled and wavy as it is peeled from the metal billet. Since the billet is rotating in a clockwise direction the wire brush 90 rotates in a counterclockwise direction to correct this curled condition of the initial metal strip as it is peeled from the billet. Thus, the rotating wire brush 90 corrects this curled effect in the metal strip 120 and guides it along a sheet metal guide tray 124, which extends from the rear portion of the straightening apparatus 86 to the forward portion of the wrapper assembly 106. The guide tray 124 directs the sheet metal strip 120 to the roller 110 and along the plate 112 where the belt wrapper 108 in conjunction with the air blast 122 guides the metal strip around the windup mandrel 104. Up to this point there has not been any tension placed on the metal strip 120. Once the metal strip has been successfully fed onto the rotating windup mandrel 104, the mandrel begins to pull the metal strip thereby placing it in tension. At this point, the wrapper assembly 106 is retracted to the position shown in dashed lines 114 in FIGURE 1 and the plate 112 and nozzle 122 pivot away from the metal strip 120. Also, the straightening apparatus 86 is pivoted such that it assumes the position shown in FIGURE 4. In this position the wire brush 90 is no longer in contact with the metal strip and the roller 98 is now in guiding contact with the metal strip 120. At this point the speed of rotation of the metal billet 36 and of the windup mandrel 104 is increased to a desired value for full operating speed. The correct relationship between the speeds of rotation of the two members is then maintained and controlled at the proper level throughout the entire cutting process. At this point, the windup assembly 12 will be applying tension to the metal strip 120 to thereby permit the cutting tool to accurately cut the metal billet into a uniformly thin metal strip of a predetermined thickness. This application of tension to a metal peeling process also results in the attainment of an extremely smooth surface of the resulting metal strip due to the absence of chatter, which is associated with normal metal cutting operations. The tension applied to the metal strip is controlled by increasing or decreasing the torque on the mandrel 104.

During the metal cutting operation, the material ahead of the cutting tool is plastically compressed causing a free chip to gather up to three or four times the thickness of the depth of cut. The ratio of the resultant chip thickness to the depth of cut is termed the "gather ratio." An ideal gather ratio would be 1, as it would result in a chip thickness equal to the depth of cut. This would enable the attainment of a chip thickness as small as the depth of cut or cutting tool infeed. The gather ratio is dependent upon the material being cut, the cutting speed, and the tension applied to the material being cut from the billet. Hence, the gather ratio can be controlled by applying tension to the metal strip being removed from the billet. The tension applied to the metal strip lowers the gather ratio and the resultant thickness of the strip by placing the metal under stress thereby decreasing the plastic compression tendencies ahead of the cutting edge. This application of tension does not affect the volume removed from the billet per unit time, since this is set by the rate of tool infeed in combination with the surface speed of the work. Therefore, the greater the tension that is applied to the strip, the thinner the strip becomes and the faster it travels. Conversely, lowering the tension decreases the stress in the strip and allows it to thicken and travel slower. This is accomplished by sensing either the strip speed or the strip thickness and then using the desired gather ratio and feeding this signal to the control for the windup motor 100 which then controls the speed of the mandrel 104. The speed of the spindle is controlled by a sensor which is fed a signal which varies according to the position of the cutting tool. Hence, as the cutting tool advances, the speed of the spindle is increased and conversely, the speed of the mandrel must be decreased. Hence, use of the above-described tension-producing assembly permits the production of extremely thin and smooth metal sheets. This application of tension to the metal strip results in a thinner and smoother product without the need of involved rolling operations.

It should also be noted that the tension which is needed to achieve a given gather ratio can vary according to a number of factors, such as the temperature of the material along the cutting line, the tool angle, sharpness of the cutting tool, material hardness and toughness, work hardening rate, and cutting speed.

The effectiveness of the subject invention will be discussed with respect to its application to three metals, copper, brass, and stainless steel.

Use of the aforegoing apparatus and process can reduce a billet of electrolytic tough pitch copper to a strip having a thickness between .003 inch and .015 inch by applying a tension between 7,000 and 10,000 pounds per square inch (based on the cross-sectional area of the strip) to the strip. Rotating the billet at a surface speed of approximately 1,300 feet per minute results in gather ratio between 2.2 and 2.3 and a strip speed of 563 to 588 feet per minute. With oxygen-free copper a strip thickness between .002 and .015 can be produced by applying a tension between 10,000 and 15,000 p.s.i. to the strip. A billet surface cutting speed of 1,300 feet per minute here results in a gather ratio between 2.1 and 2.2 and a strip speed of 588 to 616 feet per minute. For both types of copper a rake angle for the tool (the angle between the upper face of the cutting edge and the radial direction) of 30° to 40° and a relief angle (the angle between the lower face of the cutting edge and the tangential direction) of 6° to 8° have been used with particular success.

A strip of brass between .003 inch and .010 inch thick can be cut efficiently from a billet using a tension between 15,000 and 25,000 p.s.i. applied to the strip. A billet surface speed of approximately 625 feet per minute results in a gather ratio between 1.7 and 1.9 and a strip speed of 330 to 350 feet per minute. For brass, a cutting tool rake angle of 35° and a relief angle of 7° also have been used successfully.

A strip of type 321 stainless steel with a thickness between .0015 inch and .005 inch can be cut by applying a tension to the strip between 20,000 and 50,000 p.s.i. A billet surface speed of approximately 200 feet per minute here results in a gather ratio between 1.5 and 1.8 and a strip speed between 110 and 130 feet per minute. For stainless steel, a cutting tool rake angle of 25° and a relief angle of 7° has been used with particular success. It should be noted here that due to rigidity requirements a different tool holder would be needed for cutting stainless steel than would be needed for cutting copper or brass. A larger horizontal force occurs when cutting stainless steel thereby necessitating the use of a more massive tool holder than the one shown in the drawings for copper and brass.

It should be noted that under similar speed conditions the gather ratio without tension being applied is in the range of 3.0 to 4.5 for the same material, discussed above. Hence, the gather ratio with tension is approximately one-third to two-thirds of the gather ratio without tension.

It has been found convenient to use a billet with an outside diameter of 18 inches, an inside diameter of 8 inches, and a width of 6 inches. A copper billet, for example, of this size weighs approximately 400 pounds and the cutting time has been found to be approximately 3½ minutes with a billet surface speed of approximately 1,300 feet per minute. Hence, it can be seen that with appropriate automatic equipment to load and unload the billet and the resulting sheet metal coil, about 10 billets or approximately 4,000 pounds of copper could be peeled into a thin strip each hour.

Thus, the subject invention provides a method for manufacturing thin metal sheets from a metal billet by peeling the metal under tension from the billet and coiling it after it has been removed from the billet. This method also results in an extremely smooth metal strip without the need of expensive rolling operations. Hence, the subject method results in the production of an extremely desirable metal strip at a substantially reduced cost from other known methods of producing such a metal strip.

Although the invention has been disclosed with respect to one particular embodiment, it should be clear that many changes and modifications can be made thereto without departing from the scope of the invention.

I claim:

1. A method of manufacturing a metal strip comprising continuously peeling a surface layer from a rotating metal billet by relatively moving the billet and a cutting tool into cutting contact and pulling the resultant metal strip in tension over said cutting tool, said tension being controlled so as to regulate the thickness of the metal strip.

2. A method of manufacturing a thin copper strip of thickness between .002 and .015 inch, comprising continuously peeling a surface layer from a rotating copper billet having an outer cylindrical surface by relatively moving a cutting tool and said copper billet so that said tool is in cutting contact with said surface and pulling the resultant copper strip in tension over said cutting tool, the tension applied to said strip being between 7,000 and 15,000 pounds per square inch.

3. A method of manufacturing a thin stainless steel strip of thickness between .0015 and .005 inch, comprising continuously peeling a surface layer from a rotating stainless steel billet having an outer cylindrical surface by relatively moving a cutting tool and said stainless steel billet so that said tool is in cutting contact with said surface and pulling the resultant stainless steel strip in tension over said cutting tool, the tension applied to said strip being between 20,000 and 50,000 pounds per square inch.

4. A method of manufacturing a thin brass strip of thickness between .003 and .010 inch, comprising continuously peeling a surface layer from a rotating brass billet having an outer cylindrical surface by relatively moving a cutting tool and said brass billet so that said tool is in cutting contact with said surface and pulling the resultant brass strip in tension over said cutting tool, the tension applied to said strip being between 15,000 and 25,000 pounds per square inch.

5. A method of manufacturing a thin copper strip as set forth in claim 2 wherein the gather ratio at the area of contact between the cutting tool and the billet is between 2.1 and 2.3.

6. A method of manufacturing a thin stainless steel strip as set forth in claim 3 wherein the gather ratio at the area of contact between the cutting tool and the billet is between 1.5 and 1.8.

7. A method of manufacturing a thin brass strip as set forth in claim 4 wherein the gather ratio at the area of contact between the cutting tool and the billet is between 1.7 and 1.9.

8. A method of manufacturing a metal strip as set forth in claim 1 wherein said billet is mounted on a spindle through which coolant flows to remove the heat from the spindle which has been conducted from the billet to the spindle.

9. A method of manufacturing a metal strip as set forth in claim 8 wherein said coolant flow additionally cools the inner surface of the billet as it flows through said spindle.

10. A method of manufacturing a metal strip as set forth in claim 9 wherein said billet is further cooled on its outer surface by an external coolant spray.

11. A method of manufacturing a thin metal strip as set forth in claim 1 wherein the gather ratio at the area of contact between the cutting tool and the billet is between 1.5 and 2.3.

12. A method of manufacturing a metal strip as set forth in claim 1 wherein the gather ratio is between ⅓ and ⅔ of the gather ratio resulting when no tension is applied to the metal strip.

References Cited

UNITED STATES PATENTS 3,262,182  7/1966  Duret et al. _____ 29—18

FOREIGN PATENTS 64,701  8/1946  Denmark.

LEONIDAS VLACHOS, *Primary Examiner.*

UNITED STATES PATENT OFFICE
CERTIFICATE OF CORRECTION

Patent No. 3,355,971 December 5, 1967

Charles W. Vigor

It is hereby certified that error appears in the above numbered patent requiring correction and that the said Letters Patent should read as corrected below.

Column 3, line 43, for "a tungsten, carbide or titanium." read -- tungsten carbide or titanium carbide. --; line 44, for "por-" read -- portion --; column 5, line 58, for "of", second occurrence, read -- on --.

Signed and sealed this 22nd day of April 1969.

(SEAL)
Attest:

Edward M. Fletcher, Jr.
Attesting Officer

EDWARD J. BRENNER
Commissioner of Patents